United States Patent [19]

Skeels

[11] 4,223,431

[45] Sep. 23, 1980

[54] VALVE SPRING REMOVER

[75] Inventor: Louis R. Skeels, Louth, England

[73] Assignee: G.K.L. Special Tools Limited, Louth, England

[21] Appl. No.: 947,032

[22] Filed: Sep. 29, 1978

[30] Foreign Application Priority Data

Oct. 19, 1977 [GB] United Kingdom ............... 40387/77

[51] Int. Cl.³ ............................................... B23P 19/04

[52] U.S. Cl. ........................................ 29/219; 29/267

[58] Field of Search ................................ 29/215-221, 29/267

[56] References Cited

U.S. PATENT DOCUMENTS

| | | | |
|---|---|---|---|
| 1,438,791 | 12/1922 | Seppmann | 29/220 |
| 1,621,237 | 3/1927 | Davis | 29/220 |
| 1,734,122 | 11/1929 | Glaspy | 29/220 |
| 1,734,420 | 11/1929 | Curtis | 29/220 |
| 1,843,022 | 1/1932 | Eagan | 29/215 |
| 1,875,595 | 9/1932 | Harris et al. | 29/220 |

FOREIGN PATENT DOCUMENTS 714929 9/1954 United Kingdom .

*Primary Examiner*—James L. Jones, Jr.
*Attorney, Agent, or Firm*—Fay & Sharpe

[57] ABSTRACT

The invention provides a tool for facilitating the removal or mounting of valve springs of overhead valve internal combustion engines compressors or the like. A manual lever is adapted to receive at one end an upstanding bolt or stud on the cylinder head and to be secured thereto by a nut. It has a longitudinally slidable adaptor for pressing down the valve spring and openings for access to the collets.

8 Claims, 1 Drawing Figure

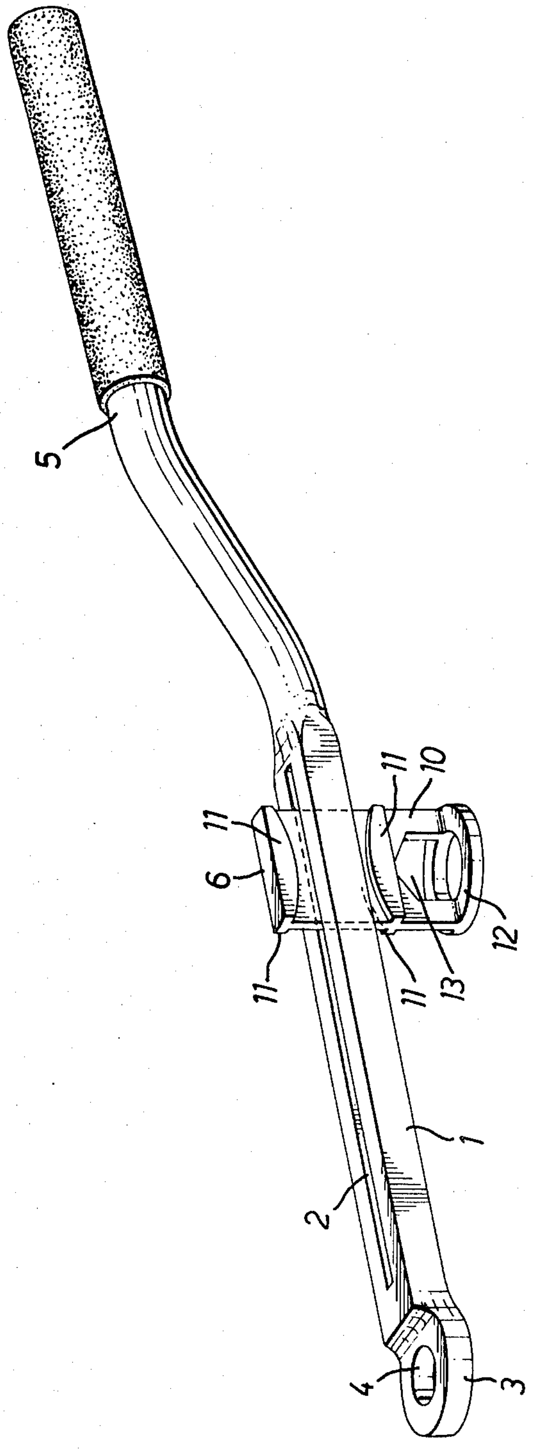
5
11
10
11
6
11
11
13
12
11
1
2
4
3

VALVE SPRING REMOVER

This invention relates to tools for use in mounting and removing valve springs and associated poppet valves from overhead valve internal combustion engines, compressors or the like.

In the normal arrangement of overhead valve internal combustion engines, the valve is slidable in the cylinder head and is urged upwardly by a helical compression spring so that its head is firmly held against the valve seat at the top of the cylinder. To open it, the valve is pushed downwardly against the spring either by an overhead cam shaft or by tappets and rockers operated by a cam shaft lower down in the cylinder block. At its lower end the spring acts against a part of the cylinder head through which the valve stem slides and at its upper end against a washer which is prevented from moving upwards along the valve stem by collets or the like. To release these collets and remove the spring, the spring must first be compressed to fully expose the collets. This has previously entailed removing the cylinder head so that the washer and the valve head can be forced towards each other by a screw clamp. There is therefore a need for a tool for removing such valve springs without removing the cylinder head.

U.K. Patent Specification No. 714,929 (published 8th September 1954) described a tool for use in removing, replacing or initially mounting spring urged poppet valves in which a lever is pivoted about a horizontal axis on a pillar attached to a workbench. A vertical valve collar pressing member is pivoted to the lever at an intermediate point and can be pushed down onto a cylinder head on the workbench. At its lower end it is bifurcated and expanded to provide access openings for the valve collets and an annular pressing disc is welded to the lower ends of the forks for pressing down the valve springs in the cylinder head. A characteristic feature of the invention is a locking arrangement including ratchet teeth on the lever and engageable with a pawl on a locking lever pivoted to the lower end of the pillar. This tool is therefore relatively complex and expensive and has to be fixed to a workbench so that the cylinder head must be removed and carried to the workbench. Furthermore the valve spring must be correctly positioned beneath the vertical valve collar pressing member and this can only be done by moving the relatively heavy cylinder head along and across the workbench.

According to the invention, we provide a valve spring remover in the form of a lever which can be held down at one end by a part of the cylinder head or a part fixed thereto, the lever having a slidable intermediate part for pressing down the spring so that the collets or the like can be removed. We also provide a method of removing valve springs using such a remover.

More preferably, the invention provides a device for facilitating the removal or mounting of valve springs of overhead valve internal combustion engines, comprising a hand lever adapted at one end to receive an upstanding bolt or stud on the cylinder head such that the end of the lever can be held down by a screw threaded member on the bolt or stud and yet the lever can be pivoted, at least over a limited arc, in a vertical plane about the connection to the bolt or stud, the lever having a rail in its intermediate section, and an adaptor mounted for longitudinal movement along the rail, the adaptor having a downwardly facing opening for receiving the upper end of a valve stem while the lower side of the adaptor is pressing against a retaining collar for the upper end of the valve spring, the adaptor also being arranged to give lateral access to collets or other means for holding the spring against upward movement relative to the valve stem when such means are released by compression of the spring by the lever.

A preferred embodiment of the invention will now be described by way of example with reference to the drawing in which the sole FIGURE shows a perspective view of a valve spring remover.

The valve spring remover comprises a lever 1 of rectangular section steel having a longitudinal slot 2. At one end there is welded a part-round plate 3 having a central hole 4. At the other end there is welded a round-section cranked handle 5. The crank in the handle 5 helps to keep the operator's fingers away from projections on the cylinder head. An adaptor 6 is slidable in the slot 2 and comprises a vertical plate 10 with four integral horizontal lugs 11, the upper lugs having a convex lower surface and the lower lugs a convex upper surface. The convex surfaces of the lower lugs 11 are particularly important as they help the adaptor to remain upright as the lever moves through an arc. As shown there is some vertical play between the adaptor 6 and the lever 1 and the adaptor can easily be slid along the rails formed by the two halves of the lever 1. The plate 10 is secured to a horizontal annular member 12 which in operation passes over the valve stem and engages the upper end of the valve spring. The plate 10 is cut away at 13 to give access to the valve spring collets. Desirably the upper lugs 11 are relatively narrow so that the adaptor 6 can be mounted by springing the central portions of the rails apart. Alternatively the adaptor 6 can be mounted before welding on the handle.

In operation, a suitable vertical cylinder head bolt or stud adjacent the valve spring is selected and the plate 3 is dropped over it. Upward movement is then prevented by screwing on a suitable nut leaving enough vertical room for the lever to pivot in a vertical plane (the hole 4 is made sufficiently large to permit an adequate arc of movement). The adaptor 6 is slid along the lever till it is over the spring and the lever is pressed down to give access to the collets. When the lever is released after removal of the collets the spring may be removed.

Valve springs may be replaced using a similar sequence of operations (though it may be necessary to hold up the valve stem while the collets are replaced).

If desired, the plate 3 can be pivotally connected to the lever so that it can be firmly screwed down and/or it can be forked instead of provided with a hole 4. Also, it is possible to use a fixed adaptor and a slidable anchoring means.

It has also been found that all the parts of the valve spring remover can be made of a suitable plastics material.

I claim:

1. A portable hand tool for facilitating the removal or mounting of valve springs of overhead valve internal combustion engines, comprising a hand lever apertured at one end to receive an upstanding bolt or stud on the cylinder head such that the end of the lever can be held down by a screw threaded member on the bolt or stud and yet the lever can be pivoted at least over a limited arc, in a vertical plane about the connection to the bolt or stud, the lever having a rail in its intermediate section, and an adaptor loosely mounted for free longitudinal sliding movement along the rail and for limited pivotal movement with respect to the rail, the adaptor having a downwardly facing opening for receiving the upper end of a valve stem while the lower side of the adaptor is stably pressing against a retaining collar for the upper end of the valve spring, the adaptor also being arranged to give lateral access to collets or other means for holding the spring against upward movement relative to the valve stem when such means are released by compression of the spring by the lever.

2. A device according to claim 1, wherein the lever is divided vertically by a slot through which part of the adaptor passes whereby the adaptor is captive on the rail but can slide freely therealong.

3. A device according to claim 2, wherein the adaptor has a convex surface against which the lever bears when it is pressed down.

4. A device as defined in claim 2, wherein said adaptor has top retaining lugs and said slot divides said lever into a pair of rails which can be sprung apart sufficiently for said lugs to pass therebetween for mounting said adaptor on said rail.

5. A device as defined in claim 1, wherein the lower side of said adaptor is annular.

6. A hand tool for remounting or removing valve springs of overhead valve internal combustion engines comprising: an elongated lever having an aperture at one end for receiving an upstanding bolt on an engine; a handle on the opposite end of said lever from said aperture, said handle being offset from said lever generally parallel to the longitudinal axis of said aperture; and, an adaptor having a downwardly facing opening for receiving the upper end of a valve stem while the lower surface of the adaptor is pressing against a retaining collar for the upper end of the valve spring, said adaptor being loosely mounted on said lever for free sliding movement therealong between said handle and aperture and for limited pivotal movement relative thereto, said adaptor extending outwardly from said lever in a direction generally opposite from the offset direction of said handle.

7. The hand tool as defined in claim 6 wherein said lever has an elongated slot therein which is open generally parallel to the longitudinal axis of said aperture and which extends therealong between said handle and aperture, said adaptor having an upper portion loosely received through said slot for sliding movement therealong and for limited pivotal movement relative thereto, said adaptor downwardly facing opening and retaining collar engaging lower surface being on one side and said lever, and retaining lugs on said upper portion on the opposite side of said lever for retaining said upper portion in said slot.

8. The hand tool as defined in claim 7 including a convex surface on said adaptor between said lever and the portion of said adaptor having said downwardly facing opening therein.

* * * * *